United States Patent
Kim et al.

(10) Patent No.: US 8,429,551 B2
(45) Date of Patent: Apr. 23, 2013

(54) APPLICATION-BASED COPY AND PASTE OPERATIONS

(75) Inventors: Jane T. Kim, Seattle, WA (US); Sean O. Lyndersay, Redmond, WA (US); Walter VonKoch, Seattle, WA (US); Matt Augustine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 11/707,212

(22) Filed: Feb. 15, 2007

(65) Prior Publication Data

US 2008/0201656 A1 Aug. 21, 2008

(51) Int. Cl.
G06F 17/00 (2006.01)
G06F 3/00 (2006.01)
G06F 3/048 (2006.01)

(52) U.S. Cl.
USPC .................. 715/770; 715/234; 715/749

(58) Field of Classification Search .................. 715/749, 715/770, 234
See application file for complete search history.

(56) References Cited

U.S. PATENT DOCUMENTS

| | | | |
|---|---|---|---|
| 5,261,080 A | 11/1993 | Khoyi et al. | |
| 5,579,521 A | 11/1996 | Shearer et al. | |
| 5,752,254 A | 5/1998 | Sakairi | |
| 5,899,996 A | 5/1999 | Dysart et al. | |
| 5,924,099 A | 7/1999 | Guzak et al. | |
| 5,926,633 A | 7/1999 | Takagi et al. | |
| 5,964,834 A | 10/1999 | Crutcher | |
| 5,999,938 A | 12/1999 | Bliss | |
| 6,177,939 B1 * | 1/2001 | Blish et al. ................ 715/770 |
| 6,199,079 B1 | 3/2001 | Gupta et al. | |
| 6,202,100 B1 | 3/2001 | Maltby et al. | |
| 6,295,541 B1 | 9/2001 | Bodnar et al. | |
| 6,490,634 B2 | 12/2002 | Coiner | |
| 6,499,042 B1 | 12/2002 | Markus | |
| 6,591,295 B1 | 7/2003 | Diamond et al. | |
| 6,662,340 B2 | 12/2003 | Rawat et al. | |
| 6,675,213 B1 | 1/2004 | Schmonsees | |
| 6,697,839 B2 | 2/2004 | Sini et al. | |
| 6,760,728 B1 | 7/2004 | Osborn | |
| 6,910,179 B1 | 6/2005 | Pennell et al. | |
| 6,983,328 B2 | 1/2006 | Beged-Dov et al. | |
| 6,986,105 B2 | 1/2006 | Walker, Jr. | |
| 7,003,546 B1 | 2/2006 | Cheah | |

(Continued)

FOREIGN PATENT DOCUMENTS

GB 2354851 4/2001
JP 2002278681 9/2002

(Continued)

OTHER PUBLICATIONS

JRWhipple & Associates, 2000, http://www.jrwhipple.com/sup_copypaste.html.*

(Continued)

*Primary Examiner* — Andrea Leggett
(74) *Attorney, Agent, or Firm* — Wolfe-SBMC

(57) ABSTRACT

Various embodiments provide application- or browser-based, copy and paste operations. In one or more embodiments, a web browser supports copy and paste functionality thus enabling the user to easily move data from one location to another. The browser-based solution can thus relieve websites from having to include code that implements the copy and paste functionality.

19 Claims, 9 Drawing Sheets

U.S. PATENT DOCUMENTS

| | | | |
|---|---|---|---|
| 7,007,041 | B2 | 2/2006 | Multer et al. |
| 7,207,008 | B1 | 4/2007 | Koch |
| 2003/0009602 | A1 | 1/2003 | Jacobs et al. |
| 2003/0220966 | A1 | 11/2003 | Hepper et al. |
| 2004/0070607 | A1* | 4/2004 | Yalovsky et al. ............ 345/746 |
| 2004/0070622 | A1* | 4/2004 | Cossey et al. ................ 345/769 |
| 2004/0103167 | A1 | 5/2004 | Grooters et al. |
| 2004/0153974 | A1 | 8/2004 | Walker, Jr. |
| 2004/0172584 | A1 | 9/2004 | Jones et al. |
| 2004/0210846 | A1 | 10/2004 | Olsen |
| 2005/0034060 | A1 | 2/2005 | Kotler |
| 2005/0066335 | A1 | 3/2005 | Aarts |
| 2005/0125377 | A1 | 6/2005 | Kotler |
| 2005/0138554 | A1* | 6/2005 | Bell et al. ...................... 715/530 |
| 2005/0155017 | A1 | 7/2005 | Berstis et al. |
| 2005/0203935 | A1 | 9/2005 | McArdle |
| 2006/0059247 | A1* | 3/2006 | Marappan et al. ............ 709/219 |
| 2006/0212905 | A1* | 9/2006 | Matsuda et al. ................ 725/51 |
| 2006/0218492 | A1 | 9/2006 | Andrade |
| 2006/0247961 | A1 | 11/2006 | Klemow |
| 2007/0226713 | A1* | 9/2007 | McGowan et al. ........... 717/147 |

FOREIGN PATENT DOCUMENTS

| | | |
|---|---|---|
| JP | 2004133943 | 4/2004 |
| JP | 2005031979 | 2/2005 |
| JP | 2006262034 | 9/2006 |
| KR | 10200504976 | 5/2005 |
| WO | WO 0073902 | 12/2000 |
| WO | WO-0217162 | 2/2002 |
| WO | WO 03030475 | 4/2003 |

OTHER PUBLICATIONS

"iNetForm Filler", http://www.inetformfiller.com/site/en/main/form-filler-features.html.

"Next Generation Warehousing with Version 9", http://www2.sas.com/proceedings/sugi28/169-28.pdf.

"M8 Multi Clipboard 9.40.00", http://www.vista-files.org/programs/m8-software-uk/m8-multi-clipboard.html.

Bill Burcham,"Baby Steps to Synergistic Web Apps",Date:Oct. 2005,http://lesscode.org/2005/10/21/baby-steps-to-synergistic-web-apps/.

Jon Udell,"Dueling simplicities",Date:Nov. 2005, http://weblog.infoworld.com/udell/2005/11/22.html.

Jack Ozzie,et al. "XML Developer Center: Simple Sharing Extensions for RSS and OPML",Date: Dec. 2006,http://msdn.microsoft.com/xml/rss/sse/.

"Page XML Developer Center. Frequently Asked Questions for Simple Sharing Extensions (SSE) e 1 of 4",http://msdn.microsoft.com/xml/rss/ssefaq/.

Bill Burcham,"Half a Baby Step",Date:Nov. 2, 2005,http://lesscode.org/2005/11/02/half-a-baby-step/.

Live Clipboard Example.

Ray Ozzie,"Live Clipboard".

Live Clipboard Screencasts,http://spaces.live.com/editorial/rayozzie/demo/liveclip/screencast/liveclipdemo.html.

"Live Clipboard Technical Introduction",http://spaces.live.com/editorial/rayozzie/demo/liveclip/livedipsample/techPreview.html.

Jack Ozzie,et al.,"Live Clipboard",Date:Apr. 2006,http://spaces.live.com/editorial/rayozzie/demo/liveclip/specification/v092.html.

MacLean et al.,"Microsoft Team RSS Blog",http://blogs.msdn.com/rssteam/archive/2005/12/07/501326.aspx.

Bill Burcham,"Ray Ozzie Demos Web App Clipboard",Date:Mar. 2006,http://www.memerocket.com/2006/03/21/ray-ozzie-demos-web-app-clipboard/.

Ray Ozzie,"Really Simple Sharing"Date: Nov. 20

Microsoft Team RSS Blog : Simple Sharing Extensions for RSS and OPML,http://blogs.msdn.com/rssteam/archive/2005/12/01/498704.aspx.

"Simple Sharing Extensions up close . . . ",http://kinrowan.net/blog/wp/archives/2005/11/23/sse-up-close.

"Microsoft Team RSS Blog",http://blogs.msdn.com/rssteam/archive/2006/01/25/517473.aspx.

eZine Approach Understanding OLE.

Ray Ozzie,"Wiring Progress . . . ".

"Zimbra—Blog—A Pint of ALE—Ajax Linking and Embedding",http://www.zimbra.com/blog/archives/2006/04/zimbra_ale-ajax_linking_and_embedding . . . .

"Zotero—The Next-Generation Research Tool",http://www.zotero.org/.

"Mozilla Corporation",https://addons.mozilla.org/firefox/4106/.

"Mozilla Corporation",https://addons.mozilla.org/firefox/748/.

"Introducing Operator",http://labs.mozilla.com/2006/12/introducing-operator.

"Kaboodle Get Started",http://www.kaboodle.com/zd/help/getStarted.html.

Hinchcliffe, "Page How Simple Sharing Extensions Will Change the Web (Dion Hinchcliffe's Web 2.0 Blog) e 1 of 10",http://web2.wsj2.com/how_simple_sharing_extensions_will_change_the_web.htm.

Dare Obasanjo aka Carnage4Life—Metadata Quality, Events Databases and Live Clipboard,http://www.25hoursaday.com/weblog/PermaLink.aspx?guid=91e40df6-c973-4bf7-8eb6-0 . . . Dec. 14, 2006.

"A web page that demos Live Clipboard", http://spaces.msn.com/editorial/rayozzie/demo/liveclip/liveclipsample/clipboardexample.html.

"Perhaps liveclipboard.org for icons, built on what was announced at Etech", http://liveclipboard.org/.

"-Some reference or doc about OLE and paste special creating a link?", http://www.glencoe.com/ps/computered/pas/article.php4?articleld=149.

"Clipboard: Adding Other Formats", (from 318265.01 search report).

"Citrine: Providing Intelligent Copy and Paste", (from 318268.01 search report).

"Synchronizing Clipboards of Multiple Computers", (from 318268.01 search report).

"The Live Clipboard XML schema spec", http://spaces.msn.com/editorial/rayozzie/demo/liveclip/specification/v092.html.

Burcham, Bill "Ray Ozzie Got the Memo", http://lesscode.ord/2006/03/22/ray-ozzie-got-the-memo/; WordPress.de, (Mar. 22, 2006), 1-4.

Ozzie, Ray "Wiring the web", *Creative Commons Attribution-Share-Alike license*, LIVECLIP@DISCUSSMS.HOSTING.LSOFT.COM,(Mar. 2007),1-5.

Ozzie, Ray "Live Clipboard—Wiring the Web", *Creative Commons Public Domain License*, http://www.liveclipboard.org/,(Apr. 21, 2006),1-2.

Ozzie, Ray "Ray Ozzie post of 4/1", http://spaces.msn.com/rayozzie/blog/cns!FB3017FBB9B2E142!377.entry_c11_blogpart_blogpart=blogview&_c=blogpart#permalink; © 2007 Microsoft, (Dec. 10, 2007),1-3.

"Clipboard", http://msdn.microsoft.com/library/default.asp?url=/library/en-us/winui/winui/windowsuserinterface/dataexchange/clipboard.asp, © 2009 Microsoft Corporation. All rights reserved.,(Dec. 10, 2007),1-5.

"PCT Search Report and Written Opinion", Application No. PCT/US2008/053728, (Jul. 18, 2008), 10 pages.

"Foreign Office Action", Chinese Application No. 200880005014.5, (Aug. 11, 2010),9 pages.

"Foreign Office Action", Chinese Application No. 200880005014.5, (Apr. 14, 2011),10 pages.

"Foreign Office Action", Chinese Application No. 200880005014.5, (Sep. 14, 2011),10 pages.

"Extended European Search Report", European Patent Application No. 08729661.2, (Mar. 20, 2012),7 pages.

Reimer, Yolanda J., et al., "Implementation Challenges Associated with Developing a Web-based E-notebook", Journal of Digital Information, vol. 4, No. 3,(Jan. 1, 2004),pp. 1-14.

"Foreign Office Action", Japanese Application No. 2009-549687, (Nov. 30, 2012), 8 pages.

* cited by examiner

APPLICATION-BASED COPY AND PASTE OPERATIONS

BACKGROUND

In some application scenarios, users wish to move data from one location to another, such as from one application to another application or from one website to another website. For example, in the browser context, a user may browse to a restaurant's website to read about the restaurant's menu selections. Once the user has decided to dine at that particular restaurant, they may then copy and paste the restaurant's address into a mapping web application form field in order to get directions to the restaurant. In these and other scenarios, there may be multiple fields to fill out, each of which requires a manual copy and paste operation. Needless to say, this places a burden on the user.

Some websites can host a control that permits copy and paste operations. This, however, not only places the burden of developing and hosting the control on the website designer, it also requires the web application to process the incoming data on a paste operation. Thus, the burden of supporting the copy and paste functionality is squarely placed on the website designer and web application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide application-based, copy and paste operations. In one or more embodiments, an application, such as a web browser, supports copy and paste functionality thus enabling the user to easily move data from one location to another. The browser-based solution can thus relieve websites from having to include code that implements the copy and paste functionality.

In one or more embodiments, data that is subject to copy and paste operations is described in a structured and discoverable way. A user interface component can be utilized to inform the user of the presence of copy-able structured data on, for example, a web page or some other resource. Once the structure of the data is discovered, such as the data's data type, the destination location(s) to which the data can be pasted can be examined for form fields that correspond in some way to the data's structure. If a destination location includes form fields that support the data's structure, a user interface component can enable the user to paste the copied data into the appropriate form fields.

Other embodiments provide browser-based transforms that can be applied to data, including structured data, to enable the data to be transformed into formats that make it more widely available to other applications.

BRIEF DESCRIPTION OF THE DRAWINGS

The same numbers are used throughout the drawings to reference like features.

DETAILED DESCRIPTION

Overview

Figure 1:
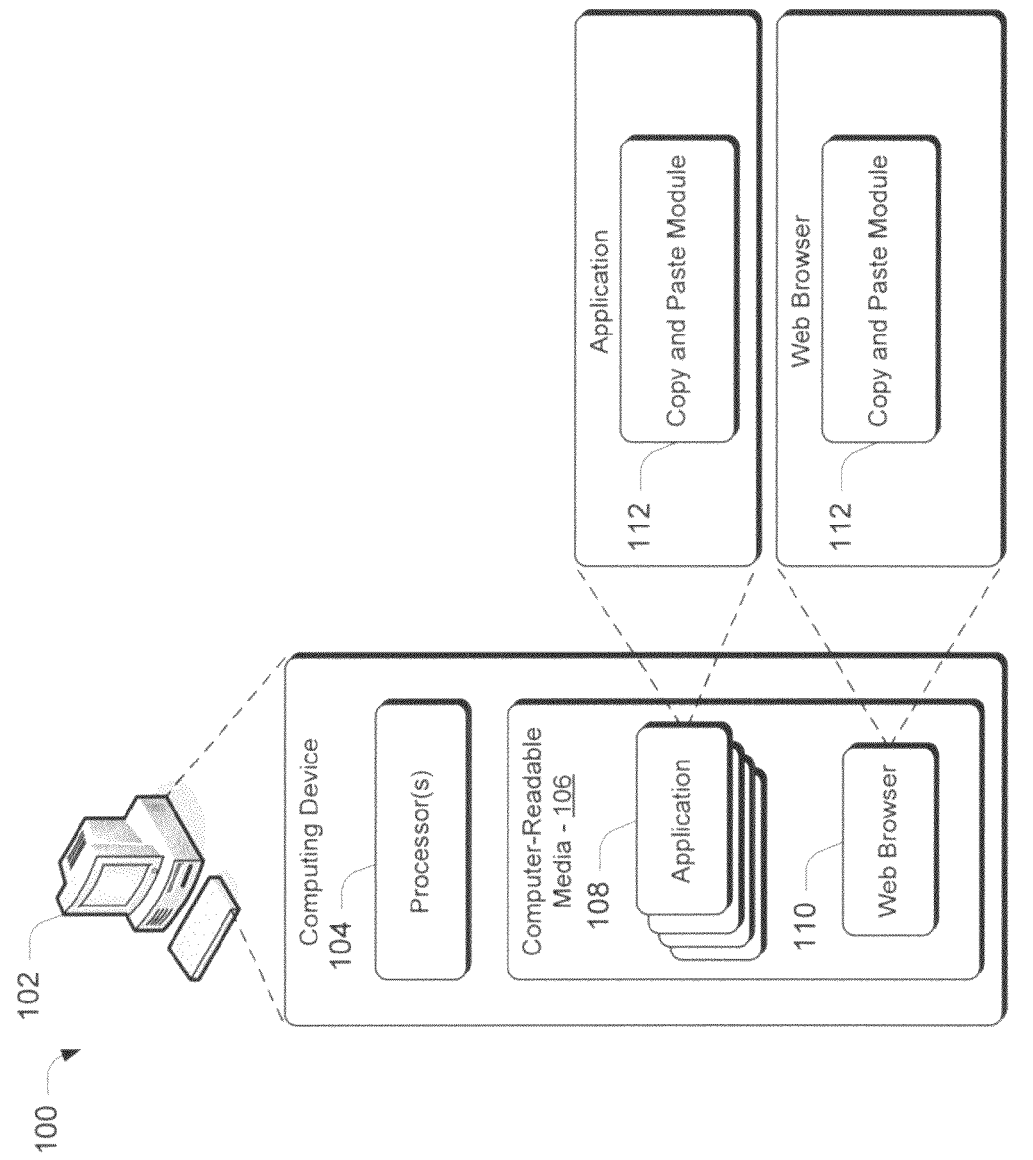
FIG. 1 illustrates a system in which various principles described herein can be employed in accordance with one or more embodiments.

Various embodiments provide application-based, copy and paste operations. In one or more embodiments, an application, such as a web browser, supports copy and paste functionality thus enabling the user to easily move data from one location to another. The browser-based solution can thus relieve websites from having to include code that implements the copy and paste functionality. That is, in various embodiments described below, the browser natively implements the copy and paste operations.

In one or more embodiments, data that is subject to copy and paste operations is described in a structured and discoverable way. A user interface component can be utilized to inform the user of the presence of copy-able structured data on, for example, a web page or some other resource. Once the structure of the data is discovered, such as the data's data type, the destination location(s) to which the data can be pasted can be examined for form fields that correspond in some way to the data's structure. If a destination location includes form fields that support the data's structure, a user interface component can enable the user to paste the copied data into the appropriate form fields.

In one or more embodiments, the copy and paste functionality can provide for a single user action to execute a copy operation, and a single user action to execute a paste operation. These single user action copy operations can, in at least some embodiments, copy data having different data types at the same time. Likewise, these single user action paste operations can, in at least some embodiments, paste data having different data types at the same time, as will become apparent below. These embodiments can be employed in connection with any suitable type of application that utilizes or can utilize copy and paste functionality, an example of which is a web browser.

Other embodiments provide browser-based transforms that can be applied to data, including structured data, to enable the data to be transformed into formats that make it more widely available to other applications.

In the discussion that follows, a section entitled "Example System" describes but one system that can be utilized to practice the principles described herein in accordance with one or more embodiments. Following this, a section entitled "Example Structured Data" introduces the notion of structured data and describes some characteristics of structured data in accordance with one or more embodiments. Next, sections entitled "Copying Structured Data" and "Pasting Structured Data" describe, respectively, examples of how structured data can be copied and pasted in accordance with one or more embodiments. Following this, a section entitled "Transforms Associated With Structured Data" describes various transforms associated with structured data such as transforming structured data into other forms, as well as transforming content into structured data in accordance with one or more embodiments. Lastly, a section entitled "Transform Plug-In" describes how different or newly-emerging data types can be handled in an extensible manner in accordance with one or more embodiments.

Example System

FIG. 1 illustrates a system in accordance with one or more embodiments, generally at 100. System 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. In addition, computing device 102 includes an application in the form of a web browser 110. Any suitably configured web browser can be utilized, examples of which are commercially available from the assignee of this document and others. One specific example of a computing device is shown and described below in FIG. 10.

In one or more embodiments, the web browser and/or other applications include or otherwise makes use of a copy and paste module 112 that functions as described above and below. The copy and paste module can comprise a native part of the application or browser, a plug-in that is subsequently added to the application or browser, and/or a standalone component that is used or otherwise leveraged by the application or browser.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

Example Structured Data

In one or more embodiments, data that is subject to the copy and paste functionality is so-called structured data. Structured data refers to data that is in a format that can be utilized by the copy and paste module 112. Structured data can be formatted in accordance with known or subsequently developed structured data standards, such as eXtensible Markup Language (XML) or HyperText Markup Language (HTML). For example, the structured data can be described in a web page's HTML in a manner that identifies the data's particular data type. Specifically, in one or more embodiments, HTML tags can be utilized to associate a data type with a particular instance of data. Alternately or additionally, structured data can be formatted using other standards, both public and private without departing from the spirit and scope of the claimed subject matter.

Figure 2:
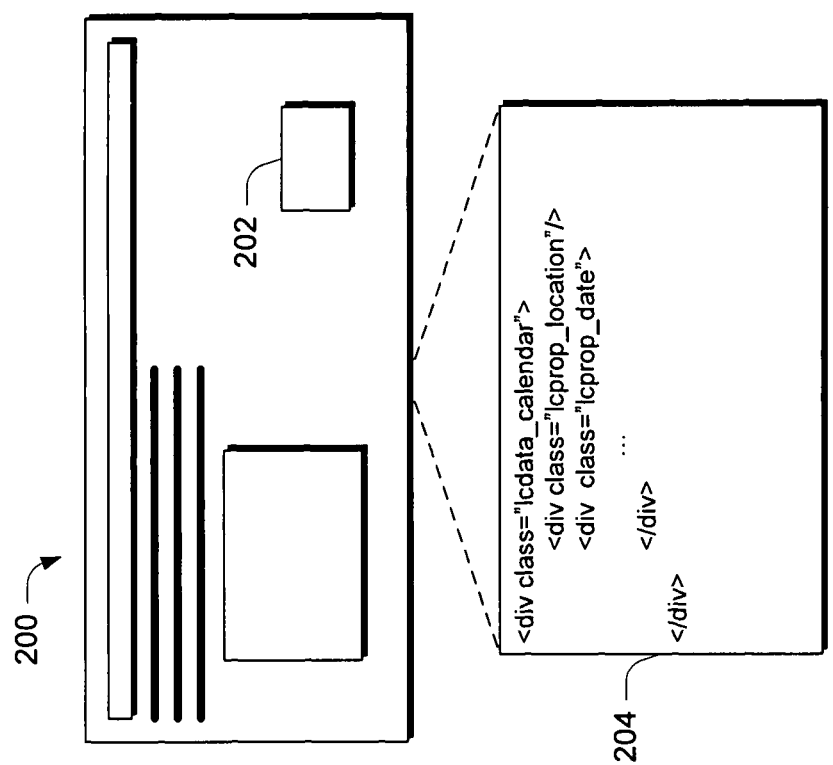
FIG. 2 illustrates an example web page that includes structured data in accordance with one or more embodiments.

As an example, consider FIG. 2. There, a web page 200 includes a calendar event 202. In this particular instance, the calendar event is associated with three fields—a location field and two date fields, each of which is associated with a data type. These fields are described in the page's HTML 204 by, for example, suitable HTML tags such as the illustrated tags. Other methods and techniques can be used to associate data types with a web site's data. For example, the data types can be described in header information or other metadata that is associated with the page.

In the example just above, the structured data was specifically described as structured data through the web page's HTML. It is also possible, however, for data to not be specifically described as structured data, but to be subsequently processed and transformed into structured data. This is described in more detail below in the section entitled "Transforms Associated With Structured Data".

Having now discussed the general notion of structured data, consider now how structured data can be copied by the browser in accordance with one or more embodiments. It is to be appreciated and understood that the examples below utilize a web browser to illustrate various embodiments. Other applications can be utilized without departing from the spirit and scope of the claimed subject matter.

Copying Structured Data

In one or more embodiments, when a browser receives a web page, such as via the Internet, it parses the web page's HTML to ascertain whether there is any structured data contained in the page. Identifying structured data can be performed in any suitable way. For example, if the structured data is specifically described in the web page's HTML, as in the example above, identifying the structured data can be performed by examining the HTML itself. In other instances where the data is not specifically described as structured data but yet resides in an ascertainable format, identifying the data as structured data can be performed by looking for characteristics or properties associated with the data and then transforming it into a structured format.

Once structured data has been identified on a web page, the browser can present a visual indicator to indicate the presence of structured data and that the structured data can be copied. Any suitable visual indicator can be utilized and any suitable way of presenting the indicator can be used.

Figure 3:
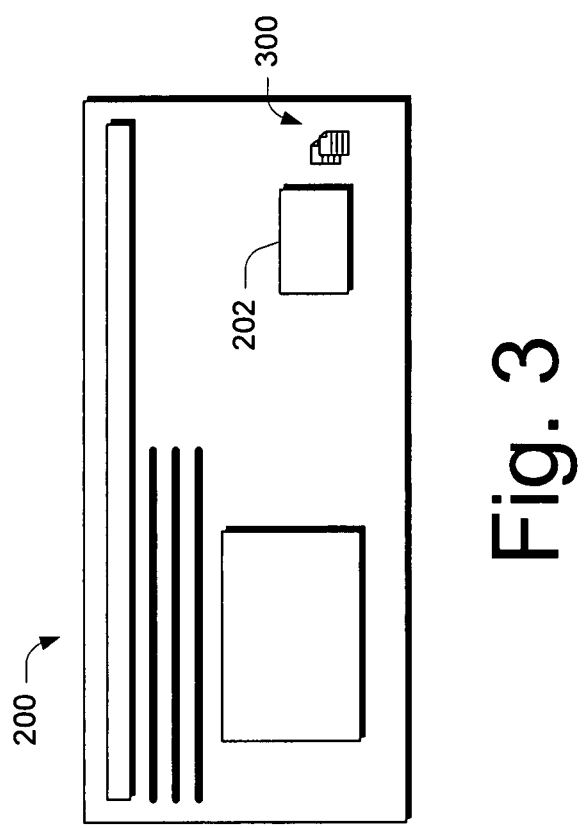
FIG. 3 illustrates an example web page having a visual copy indicator in accordance with one or more embodiments.

As an example, consider FIG. 3, which illustrates the FIG. 2 web page. Notice that along-side calendar event 202 a visual indicator 300 in the form of a copy icon is displayed. This indicator informs the user that the calendar event includes structured data that can be copied. In one or more embodiments, the icon can be displayed automatically when the page is rendered. In one or more other embodiments, the icon can be selectively displayed when, for example, the user hovers their cursor over or near the structured data.

In one or more embodiments, if the user invokes a copy operation on the structured data by, for example, clicking on the visual indicator, the browser parses the structured data into individual fields and copies the structured data to the system's clipboard or another suitable location. The copied data is now available for pasting.

In one or more embodiments, the browser's (or other application's) copy functionality can provide for a single user action to execute a copy operation after the copy icon is exposed. Specifically, in this example, if the user simply clicks on the copy icon, all of the structured data associated with that icon is selected and copied to the clipboard. That is, the single user action includes both selecting the content for copying and copying the content to the system's clipboard. This relieves the user from having to (1) physically select the content that is to be copied by, for example, executing a left click/drag operation, (2) executing a right click operation to expose a menu having a copy operation selection, and (3) selecting the copy operation.

Notice also that in some instances, this single user action can result in copying data having different data types at the same time. For example, calendar event 202 includes data having two different data types—a location type and a date type. By clicking on the copy icon, a copy operation is performed and both the location and date data are copied to the clipboard.

Having discussed an example copy operation, consider now how the browser can paste copied data in accordance with one or more embodiments.

Pasting Structured Data

When a user navigates to a website or web application, the browser ascertains whether the website or application supports structured data. For example, in the website scenario, the browser parses the HTML of the web page looking to see if the web page supports structured data. Specifically, in one or more embodiments, the browser can examine the HTML of the web page looking to see if there are form fields that are marked up with values that indicate data types for structured data. In the web application scenario, the web application can communicate which types of structured data it supports through its programmatic interaction with the web browser.

Figure 4:
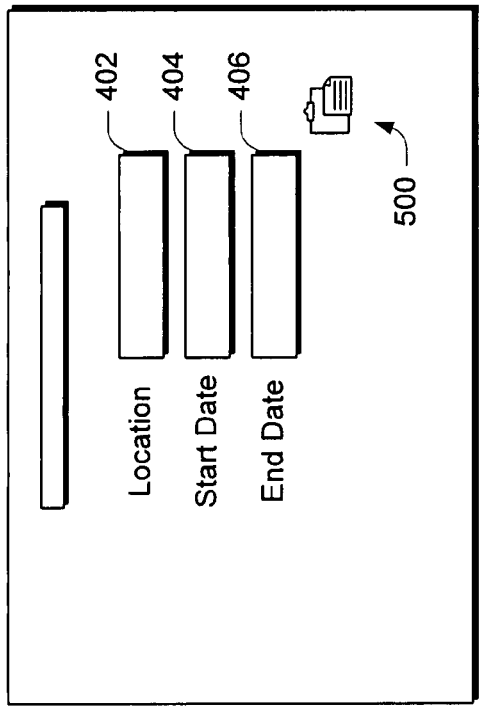
FIG. 4 illustrates an example web page having example form fields in accordance with one or more embodiments.

As an example, consider FIG. 4. There, an example web page 400 is shown with three fields—a location field 402, a start date field 404 and an end date field 406. In this web page's HTML, these fields can be marked up such that a data type is associated with the individual field. Alternately or additionally, data types can be declared in the header of the HTML or elsewhere in the HTML.

In one or more embodiments, when the browser finds data types on a web page that match or are similar to data types of data contained on the system's clip board, the browser can display a visual indication near the fields that indicates that paste capability is available.

Figure 5:
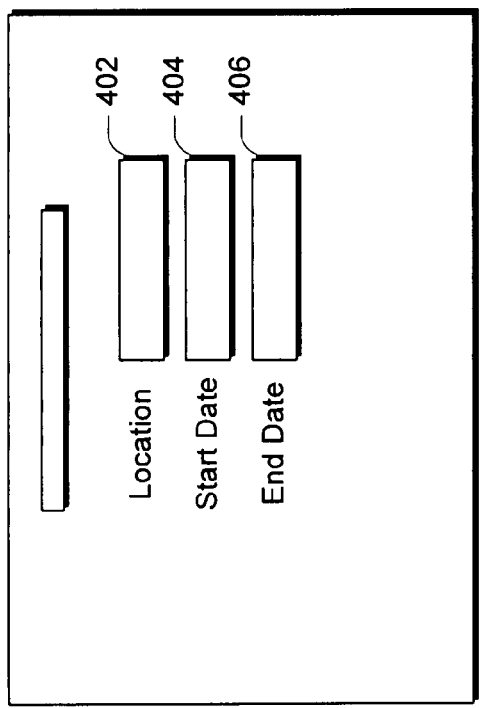
FIG. 5 illustrates the FIG. 4 web page with a visual paste indicator in accordance with one or more embodiments.

As an example, consider FIG. 5. There, the FIG. 4 web page is shown along with a visual indication 500 in the form of a paste icon. Any suitable visual indication can be used. In addition, any suitable manner of displaying the visual indication can be used. For example, in some embodiments the visual indication can be displayed automatically when the page is rendered. In other embodiments, the visual indication can be selectively displayed when the user hovers their cursor near the appropriate fields.

Once the visual indication is displayed, the user can interact with it by, for example, clicking on it. In one or more embodiments, when the user clicks on the visual indication, the browser looks for properties or data types on the clipboard that correspond to those on the web page and pastes the corresponding data in the appropriate locations. It is to be appreciated and understood that other means of selecting the copy and paste icons can be utilized, other than clicking, without departing from the spirit and scope of the claimed subject matter.

Figure 5A:
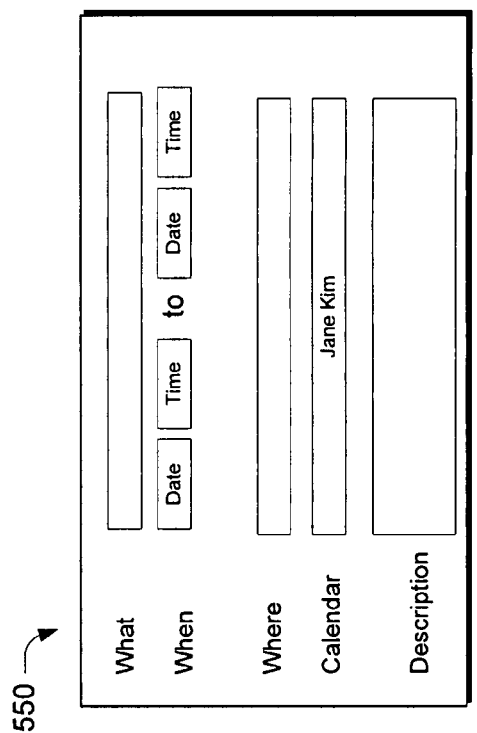
FIG. 5a illustrates an example form in accordance with one or more embodiments.

As but one example of how a page's form fields can be marked up so that a browser can make an association between the form field and structured data that has been copied, consider FIG. 5a. There, a form 550 includes multiple different fields including "What", "When", "Where", "Calendar" and "Description" fields. As an example of markup that can be used to mark these fields up, consider the following:

```
<div class="mfe_vevent">
    <div>What <input class="mf_summary" type="text"></div>
    <div>When<input class="mf_dtstart" type="text"> to <input
    class="mf_dtend" type="text"></div>
    <div>Where <input class="mf_location" type="text"></div>
    <div>Calendar
```

-continued

```
<select class="mf_organizer">
    <option value="Jane Kim">Jane
    <option value="Sean Lyndersay">Sean
</select>
</div>
    <div>Description <input class="mf_description" type="text"></div>
</div>
```

In practice, in this example, all that a developer has to do to adequately mark their fields up is to provide "class="xyz"" designations in their form's markup, as will be appreciated by the skilled artisan.

In one or more embodiments, the browser's (or other application's) paste functionality can provide for a single user action to execute a paste operation once the paste icon is exposed. Specifically, notice in this example that if the user simply clicks on the paste icon, data on the clipboard that corresponds with the data types of the associated data fields is pasted into the appropriate fields. That is, the single user action can select the content on the clipboard that is to be pasted and paste the content into the appropriate fields. After having copied the data that is to be pasted, this relieves the user from having to (1) place their cursor in each individual field, (2) execute a right click operation to expose a menu with a paste operation selection, and (3) select the paste operation.

Notice also that in some instances, this single user action can result in pasting data having different data types at the same time. For example, recall that the calendar event includes data having two different data types—a location type and a date type. By clicking on the paste icon, a paste operation is performed and both the location and date data is pasted into the appropriate fields at the same time.

It is to be appreciated and understood that while the example above copies data from a web page, the data could be copied from other locations. For example, in some embodiments, the user may have a so-called web store that holds structured data that has been saved by the user or otherwise deposited into the store. In this case, the copy and paste operation would be performed by copying data from the web store and pasting it into a web-based form. Alternately or additionally, copy and paste operations can be performed across applications. For example, using the techniques described above, a user can copy a calendar event from an application such as Microsoft's Outlook® application, and paste it into a web application's form fields.

Figure 6:
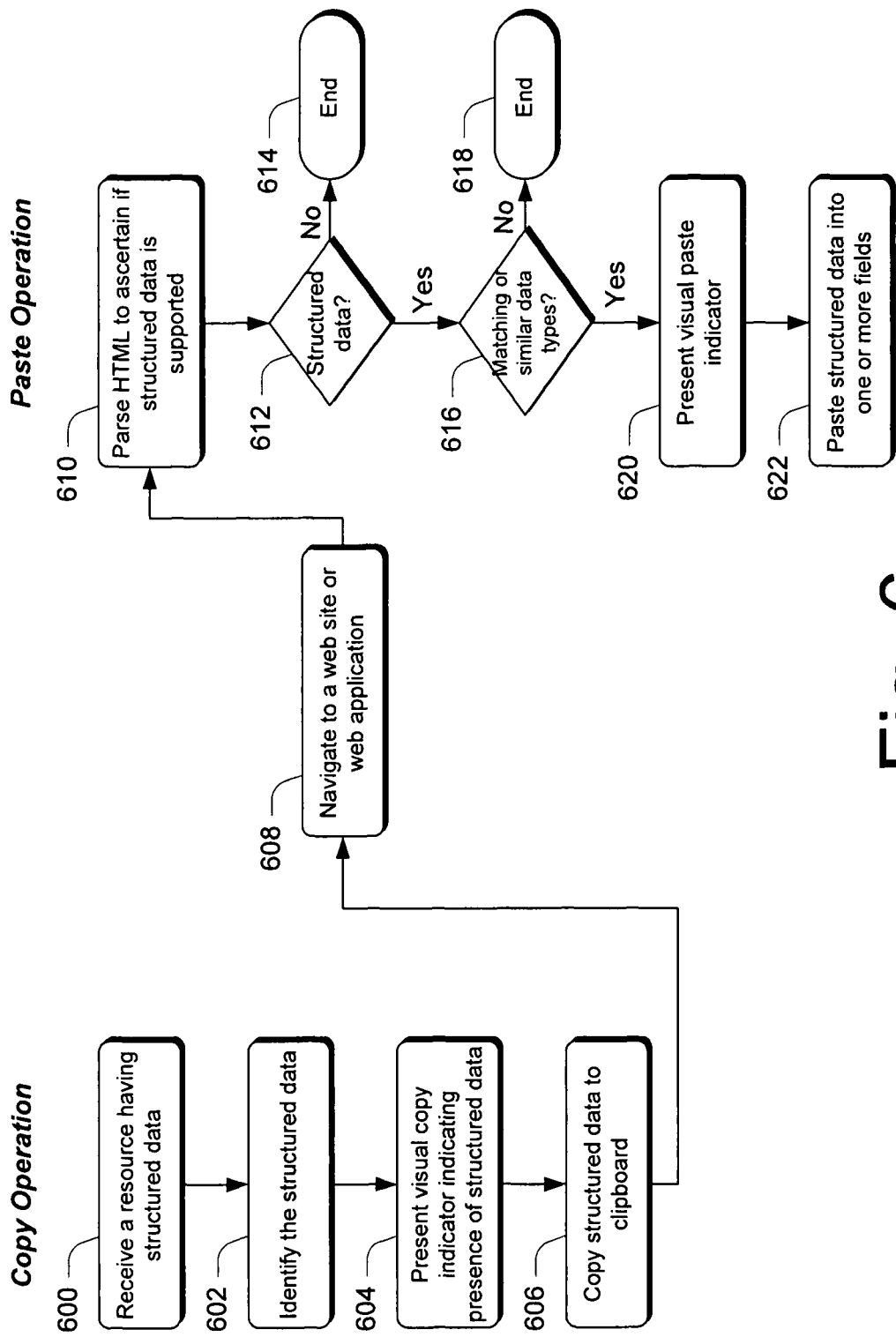
FIG. 6 is a flow diagram that describes steps in a copy and paste method in accordance with one or more embodiments.

FIG. 6 is a flow diagram that describes steps in a copy and paste method in accordance with one or more embodiments. The method can be performed in connection with any suitable hardware, software, firmware or combination thereof. In one or more embodiments, the method is performed by a suitably configured web browser, such as the web browser shown and described in FIG. 1. The flow diagram is divided into a portion which describes an example copy operation in accordance with one or more embodiments, and an example paste operation in accordance with one or more embodiments.

Step 600 receives a resource having structured data. Any suitable type of resource can be received. For example, a resource can comprise a web page, data that is received from a web store, or any other suitable type of structured data. Step 602 identifies the structured data. This step can be performed in any suitable way examples of which are given above. Step 604 presents a visual copy indicator indicating the presence of structured data. Examples of how this can be done are provided above. Step 606 copies structured data to the system's clipboard. This step can be performed responsive to the user invoking a copy operation by clicking on or otherwise selecting the copy indicator.

Step 608 navigates to a web site or a web application. This step can be performed by a user engaging the browser's navigation functionality. Step 610 parses a web page's HTML to ascertain if structured data is supported. This step can be performed by examining the page's HTML and looking for any structured data values that might appear on the page. If, at step 612, structured data is not supported, then step 614 ends the method. If, on the other hand, structured data is supported, then step 616 ascertains whether there are any form fields that have data types that match or are similar to those of data that have been copied to the clipboard. If there are no matching or similar data types, then the method ends at 618. If, on the other hand, there are matching or similar data types, step 620 presents a visual paste indicator. Examples of how this can be done are described above. Step 622 pastes structured data into one or more of the form fields. This step can be performed responsive to a user invoking a paste operation by clicking or otherwise selecting the visual paste indicator.

With respect to the determination of whether a data type is similar in step 616, data types can be similar if they are associated with data that share common properties or characteristics. For example, a date data type can be considered to be similar to a date/time data type because both share a date property.

Transforms Associated with Structured Data

In the discussion that follows, two different types of transformations are described. First, transformations that can be applied to structured data to transform the data into one or more different formats are described. Second, transformations that can be applied to data to transform it into structured data are described.

Figure 7:
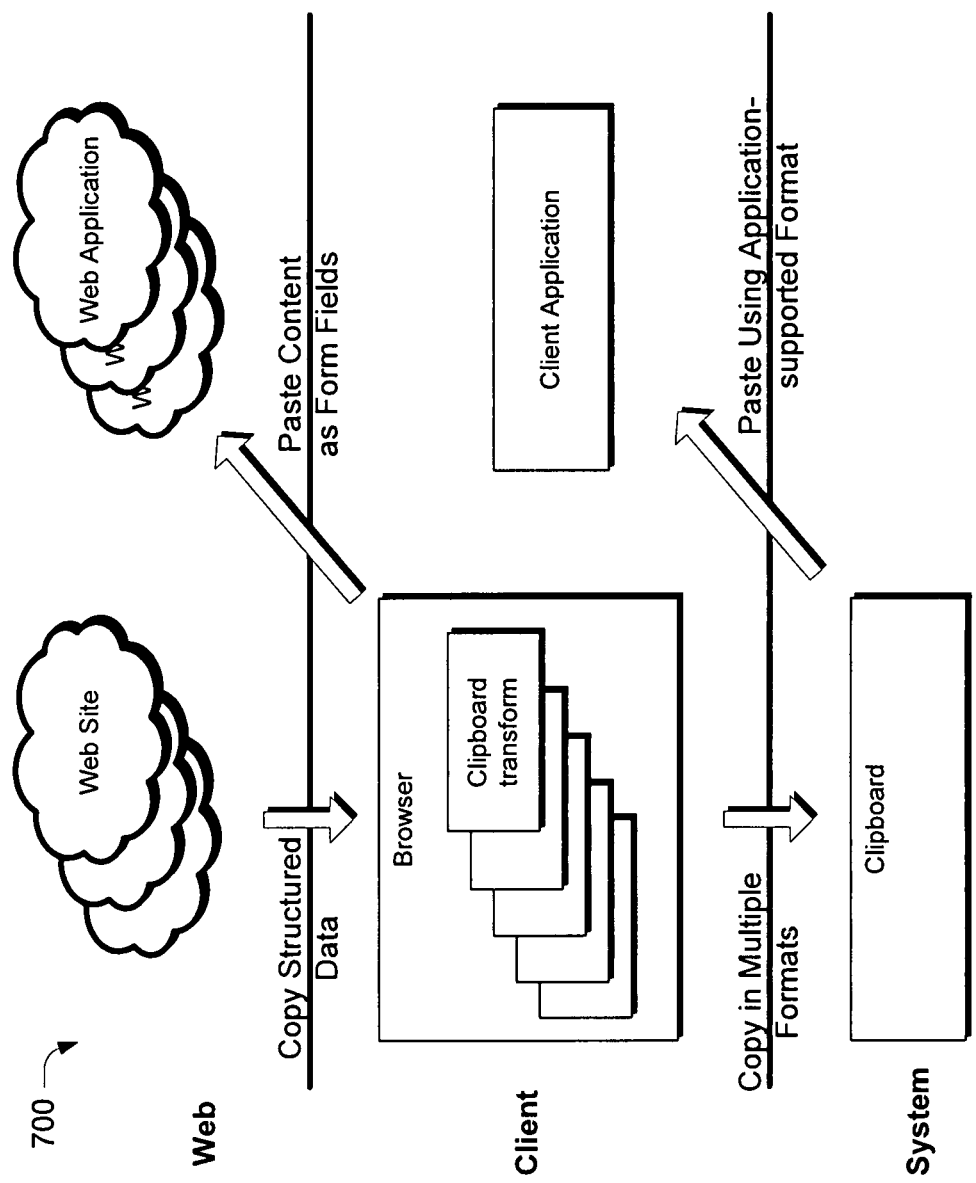
FIG. 7 illustrates an example system in accordance with one or more embodiments.

In one or more embodiments, when the browser copies structured data from a particular site, it can transform the structured data from one format into another. For example, if the structured data type is a contact, then the browser might transform the contact into another format that various other applications can use, such as a vCard format and/or rich text format. As an example, consider FIG. 7.

There, a high-level overview of a system is shown generally at 700. In this system, a representation of the World Wide Web includes various websites and web applications. A client embodied on a computing device, such as computing device 102 in FIG. 1, comprises a browser application and one or more client applications. In addition, the system on which the client executes includes a clipboard to which structured data can be copied. In this example, the browser includes one or more transforms that can operate on structured data to transform it from one format to another. Once the transform(s) is (are) applied to the structured data, the transformed data can be copied onto the clipboard. From there, the copy and paste functionality can be utilized to copy the structured data to not only various other web pages and web applications as described above, but to other applications that support the particular format to which the structured data has been transformed. This can enable existing applications that do not necessarily understand web data to integrate with it nonetheless. It is to be appreciated and understood that any suitable transforms can be utilized to transform any suitable type of web data. As the numbers and types of client applications can vary widely, so too can the numbers and types of transforms.

Figure 8:
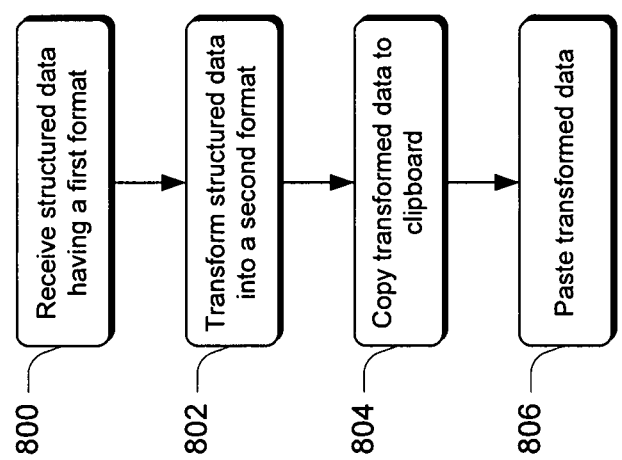
FIG. 8 illustrates a flow diagram that describes steps in a method in accordance with one or more embodiments.

FIG. 8 is a flow diagram that describes steps in a transformation method in accordance with one or more embodiments. The method can be performed in connection with any suitable hardware, software, firmware or combination thereof. In one or more embodiments, the method is performed by a suitably configured web browser, such as the web browser shown and described in FIG. 1.

Step 800 receives structured data having a first format. This step can be performed by the browser receiving a resource that includes the structured data. Example resources are described above. In one or more embodiments, the first format can include HTML that describes the structured data. Step 802 transforms the structured data into a second format which is different from the first format. This step can be performed by transforming the structured data into multiple different formats. In at least some embodiments, the transformation can include transforming the data into a format other than an HTML format. This format can be one that is understood by applications that do not necessarily understand or process HTML. Step 804 copies the transformed data to the system's clipboard. In one or more embodiments, the structured data can be copied in multiple different formats that can be used by multiple different types of applications. Step 806 pastes the transformed data in a manner that makes it available for use by one or more applications that understand the particular format of the data.

In one or more embodiments, transformations can also be applied to content to transform it into structured data. For example, various applications can add content to a clipboard. The browser can monitor the clipboard and when content is copied onto the clipboard, the browser can apply one or more transformations so that the data is transformed into structured data that a website or web page can consume. For example, if the browser is aware of the particular format of data that is copied to the clipboard, then it can select and apply an appropriate transform. In other embodiments, the browser can examine the properties or characteristics associated with the data and select a transform based on the properties. For example, if an address is copied to the clipboard, the browser can look for properties commonly associated with an address such as use of the terms "street", "avenue", "road" and a zip code. The browser can then make an intelligent decision and select a transform that transforms the data into a structured format that describes the form or structure of the data. One way of doing this is to transform the data so that it now includes tags or metadata that describes the data as an address.

Transform Plug-in

Figure 9:
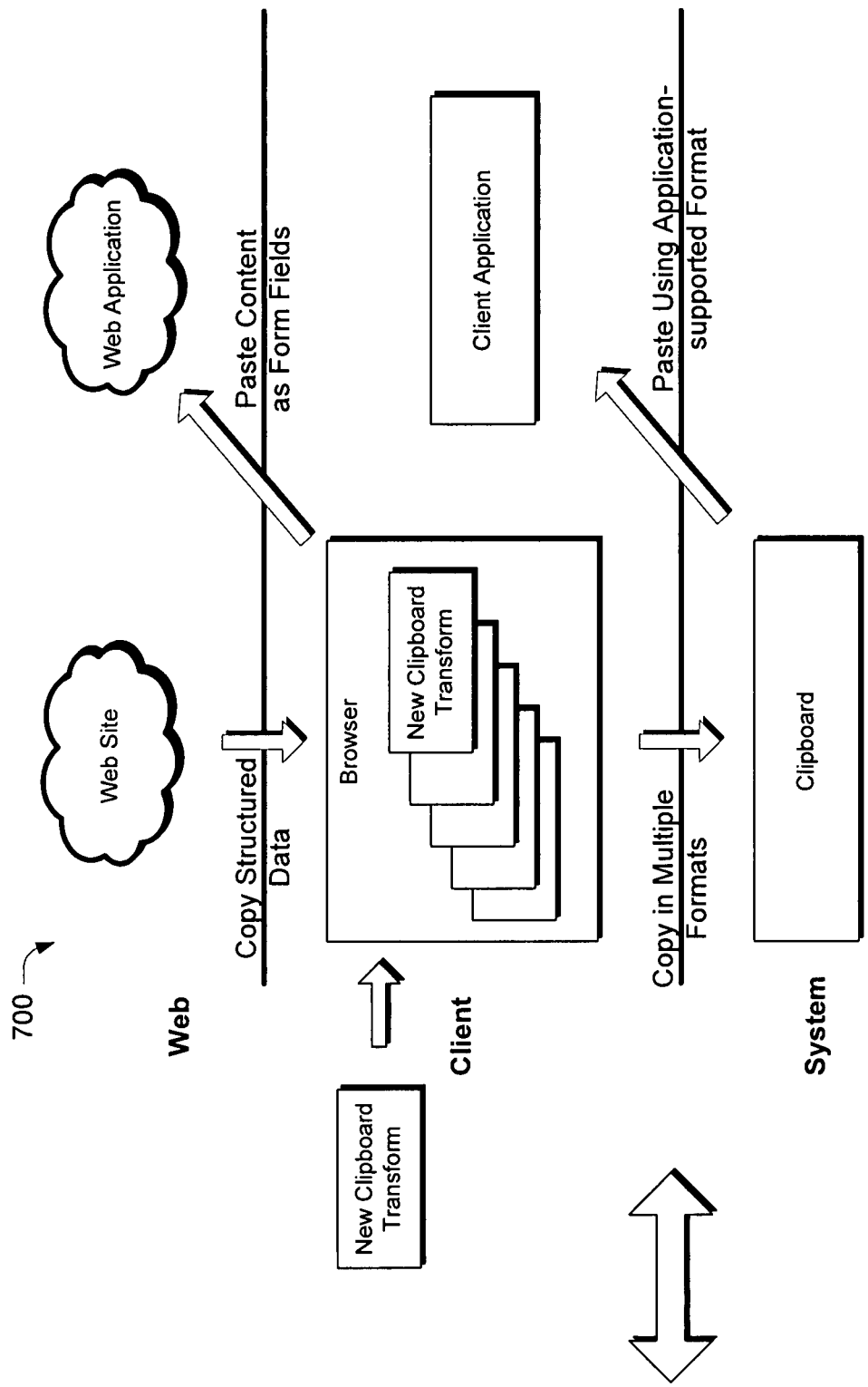
FIG. 9 illustrates an example system in accordance with one or more embodiments.

As more and more new structured data types emerge, it can be useful to be able to process these new structured data types as described above. Accordingly, in one or more embodiments, a browser plug-in model can allow application developers to provide their own transforms that can be applied to content when it is copied onto the clipboard. As an example, consider FIG. 9. There, the FIG. 7 system is shown and operates substantially as described above. In addition, however, this system includes a plug-in model that allows new clipboard transforms to be added to the browser to process new structured data types.

Figure 10:
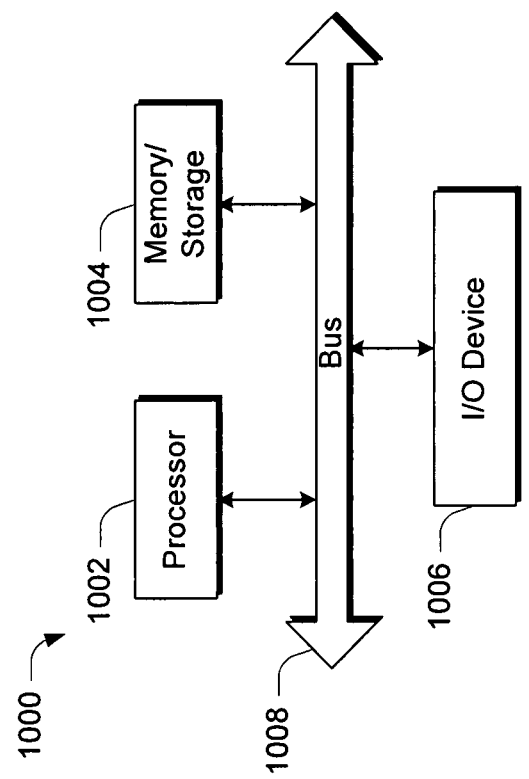
FIG. 10 illustrates an example computing device that can be used to implement one or more embodiments.

FIG. 10 illustrates an example computing device 1000 that can implement the copy and paste functionality described above. Computing device 1000 can be, for example, computing device 102 of FIG. 1 or any other suitable computing device.

Computing device 1000 includes one or more processors or processing units 1002, one or more memory and/or storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Various embodiments provide application-based, copy and paste operations. In one or more embodiments, a web browser supports copy and paste functionality thus enabling the user to easily move data from one location to another. The browser-based solution can thus relieve websites from having to include code that implements the copy and paste functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, with a web browser that natively implements copy and paste operations, a resource having at least one structure of data, a structure of data comprising a designator identifying the structure of data and containing at least one field, wherein the at least one structure of data in the resource comprises multiple data fields and at least one field of the structure of data being defined with a data type that is different from a data type associated with a second field of the structure of data;
   identifying, with the web browser, the at least one structure of data in the resource, the identifying including an ability to examine HyperText Markup Language (HTML) associated with the resource to identify the structure of data in the resource by:
   identifying the designator within the HTML; and
   identifying the at least one field within the HTML; and
   responsive to identifying the at least one structure of data in the resource, displaying, with the web browser, a selectable visual copy icon indicating presence of the identified at least one structure of data and that the identified at least one structure of data can be selected and copied responsive to a single user action that selects the selectable visual copy indicator, wherein the single user action is the only user action that is needed to select and copy the identified at least one structure of data and wherein the web browser is configured to enable selective display of the selectable visual copy icon, the selective display comprising selectively displaying the selectable copy icon responsive to a cursor being hovered over or near the identified at least one structure of data.

2. The method of claim 1, wherein the resource comprises a web page.

3. The method of claim 1 further comprising copying, with the web browser, the identified at least one structure of data in the resource responsive to a user invoking a copy operation.

4. The method of claim 3 further comprising ascertaining, with the web browser, whether a different resource supports one or more structures of data.

5. The method of claim 4, wherein the different resource comprises a web page and the act of ascertaining is performed by examining the web page's HTML.

6. The method of claim 4 further comprising, responsive to ascertaining that the different resource supports one or more structures of data, presenting, with the web browser, a visual paste indicator.

7. The method of claim 6 further comprising selecting and pasting, with the web browser, the copied at least one structure of data responsive to the user invoking a paste operation on the visual paste indicator using a single user action.

8. The method of claim 4, wherein the act of ascertaining comprises ascertaining whether the different resource has any form fields with data types that match data types of data that has been copied.

9. The method of claim 5, the act of examining the web page's HTML further comprising examining the HTML of the web page to locate one or more data types described within the HTML that match at least one data type associated with a field of the identified at least one structure of data.

10. The method of claim 1, the at least one structure of data further comprising private and public data fields.

11. The method of claim 1 further comprising identifying the at least one structure of data based, at least in part, upon properties associated with the at least one structure of data.

12. One or more computer-readable storage media hardware embodying a web browser configured to:
  identify a data structure contained within a resource, the data structure comprising:
    a designator identifying the data structure, the designator being associated with indicating a grouping of data fields associated with the data structure; and
  implement copy and paste operations, wherein the copy operation enables the identified data structure to be selected and copied by a single user action that selects a selectable copy icon that is associated with the identified data structure, and the paste operation enables pasting of the identified data structure by a different single user action that selects a selectable paste icon that is associated with the identified data structure, wherein the single user action and the different single user action are the only actions, respectively, that are performed to enable the copy operation and the paste operation and wherein the web browser is configured to enable selective display of the selectable copy icon without requiring user input relative to displayed user instrumentation that is designed to enable access to the selectable visual copy icon.

13. The one or more computer-readable storage media hardware of claim 12, wherein the web browser is configured to copy a data structure from one web page to another web page.

14. The one or more computer-readable storage media hardware of claim 12, wherein the web browser is configured to copy a data structure from one web page to an application.

15. The one or more computer-readable storage media hardware of claim 12, wherein the web browser is configured to transform a data structure into one or more different formats.

16. The one or more computer-readable storage media hardware of claim 12, wherein the web browser is configured to transform data into a data structure.

17. The one or more computer-readable storage media hardware of claim 12, wherein the web browser is configured to copy data from locations other than a web page.

18. A system comprising:
  one or more computer-readable storage media hardware;
  a web browser embodied on the one or more computer-readable storage media hardware, the web browser configured to implement a method comprising:
    receiving, with the web browser, a resource having at least one class;
    identifying, with the web browser, the at least one class in the resource;
    displaying a selectable copy icon, wherein the selectable copy icon enables a copy operation to be performed that comprises selecting and copying of data associated with the at least one class in the resource in a single user action, wherein the single user action is the only user action that is utilized to both select and copy the data associated with the class and wherein the web browser is configured to enable selective display of the selectable copy icon without requiring user input relative to displayed user instrumentation that is designed to enable access to the selectable copy icon;
    receiving data associated with the at least one class in the resource having a first format;
    transforming the data associated with the at least one class in the resource from the first format to at least a second different format, wherein the transforming is performed by the web browser automatically as part of the copy operation without user input as to the transforming;
    copying the transformed data to a clipboard; and
    pasting the copied transformed data, the web browser further configured to ascertain that one or more other applications are configured to support the transformed data.

19. The system of claim 18, wherein the web browser is configured to allow new transforms to be added to the browser.

* * * * *